US010563692B1

(12) United States Patent
Reiff

(10) Patent No.: US 10,563,692 B1
(45) Date of Patent: Feb. 18, 2020

(54) DUST BOOT WITH GREASE RELIEF

(71) Applicant: RB Distribution, Inc., Colmar, PA (US)

(72) Inventor: Thomas Allan Reiff, Lafayette Hill, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 16/391,960

(22) Filed: Apr. 23, 2019

(51) Int. Cl.
*F16C 11/06* (2006.01)
*F16J 3/04* (2006.01)
*F16D 3/84* (2006.01)

(52) U.S. Cl.
CPC ........ *F16C 11/068* (2013.01); *F16C 11/0671* (2013.01); *F16J 3/046* (2013.01); *F16D 2003/846* (2013.01); *F16J 3/041* (2013.01)

(58) Field of Classification Search
CPC ........ F16C 11/0666; F16C 11/068; F16J 3/04; F16J 3/046; F16D 3/845; F16D 2003/086
See application file for complete search history.

(56) References Cited

U.S. PATENT DOCUMENTS

| 3,135,539 | A | 6/1964 | Ulderup et al. |
| 3,187,590 | A | 6/1965 | Duggan |
| 3,208,290 | A | 9/1965 | Mathues et al. |
| 3,248,955 | A * | 5/1966 | Templeton ............. B60G 7/005 277/635 |
| 3,572,379 | A | 3/1971 | Popa et al. |
| 3,896,849 | A | 7/1975 | Ervin et al. |
| 4,003,666 | A * | 1/1977 | Gaines .................. F16C 11/068 403/36 |
| 4,003,667 | A | 1/1977 | Gains et al. |
| 5,536,019 | A | 7/1996 | Bryant et al. |
| 5,568,930 | A | 10/1996 | Urbach |
| 5,695,202 | A | 12/1997 | Cartwright et al. |
| 5,765,837 | A | 6/1998 | Schwärzler |
| 6,308,959 | B1 | 10/2001 | Sokolihs et al. |
| 7,063,331 | B2 * | 6/2006 | Iwano ..................... F16D 3/845 277/634 |
| 7,077,296 | B2 | 7/2006 | Brown et al. |
| 7,670,078 | B2 | 3/2010 | Elterman et al. |
| 7,704,007 | B2 | 4/2010 | Elterman et al. |
| 7,862,250 | B2 | 1/2011 | Kuru |
| 10,175,068 | B2 | 1/2019 | Chambers et al. |
| 10,274,020 | B2 * | 4/2019 | Cassell .................... F16J 3/042 |
| 2007/0059092 | A1 * | 3/2007 | Elterman ................ F16D 3/845 403/50 |
| 2009/0232589 | A1 * | 9/2009 | Kuru ..................... F16C 11/068 403/134 |
| 2011/0074119 | A1 * | 3/2011 | Deane ...................... F16J 3/042 277/634 |
| 2017/0292564 | A1 * | 10/2017 | Lonergan, III ....... F16C 11/068 |
| 2018/0119748 | A1 * | 5/2018 | Cassell .................... F16J 3/042 |
| 2018/0258983 | A1 * | 9/2018 | Reddehase .......... F16C 11/0628 |

* cited by examiner

*Primary Examiner* — Nicholas L Foster
(74) *Attorney, Agent, or Firm* — Volpe and Koenig, P.C.

(57) ABSTRACT

A dust boot for a suspension assembly, particularly a ball joint, includes a side wall with at least one relief opening and a cover that overlies the at least one relief opening.

17 Claims, 5 Drawing Sheets

DUST BOOT WITH GREASE RELIEF

FIELD OF INVENTION

The invention relates to a dust boot for parts used in suspension systems. More particularly, the invention relates to dust boots used in connection with suspension parts of vehicles having retained grease. Most particularly, the invention relates to dust boots used in connection with grease retaining ball joints.

BACKGROUND

Suspension parts, such as ball joints, are frequently pre-lubricated, moving assemblies enclosed in a casing to prevent dirt and debris from entering the assembly. Any dirt or debris that enters the assembly may erode the contacting surfaces and prevent the assembly from moving or functioning properly.

By way of an exemplary suspension part, a ball joint, whether self-lubricating or manually lubricated, may build up lubricant pressure on the boot due to active movement of the assembly. If this pressure is not relieved, it can limit the flexibility of the boot and lead to a failure of the boot. This boot failure may lead to premature failure of the entire suspension assembly due to the ingress of dirt or debris. It has been known to relieve this pressure through a vent in the boot. However, the effectiveness of this approach can depend on the flexibility of the boot and the release of lubricant through the vent may attract and hold dirt or debris that could enter the assembly.

In view of the above, it has been determined that the boot vent should be protected from the external environment.

SUMMARY

A dust boot is provided with a side wall that has a covered relief opening. The cover overlying the relief opening extends outwardly so that the relief opening is recessed inwardly from the forward face of the cover.

The dust boot is particularly suitable for use with a ball joint that is pre-lubricated.

BRIEF DESCRIPTION OF THE DRAWINGS

The following detailed description will be better understood when read in conjunction with the appended drawings, in which like numbers identify the same or functionally similar elements.

DETAILED DESCRIPTION

Figure 1:
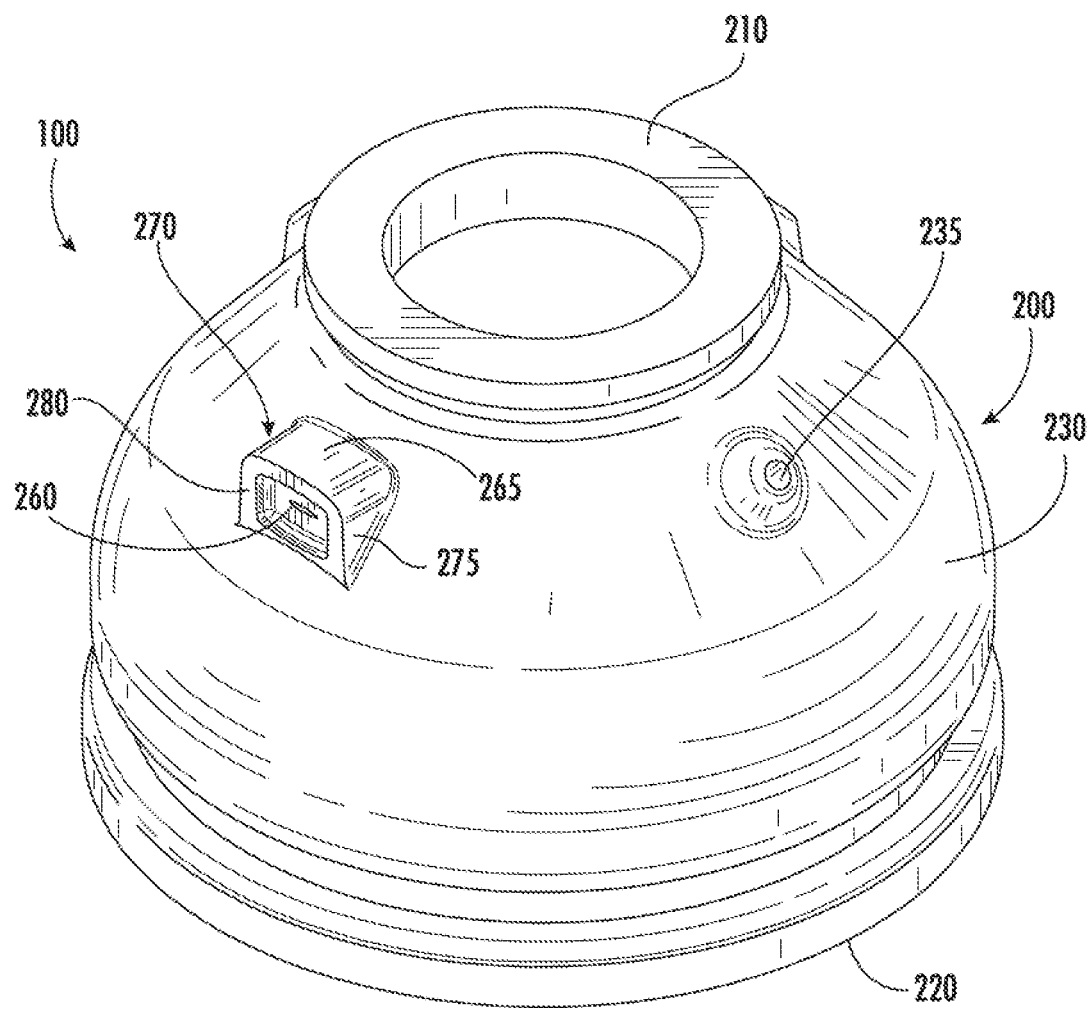
FIG. 1 is a perspective view of a boot according to the invention.

With reference to FIG. 1, the boot 100 is used in conjunction with vehicle suspension parts, such as a ball joint, to serve a number of purposes and is commonly referred to as a dust boot. The boot 100 comprises a body 200 with a first open surface 210, a second open surface 220, and a side wall 230 that extends between the first open surface 210 and the second open surface 220 to define an interior space that encloses a suspension element. The side wall 230 of the body 200 curves from the first surface 210 to the second surface 220. The side wall 230 of the boot 100 includes at least one relief or vent opening 260. The side wall 230 includes at least one cover 270 that overlies the opening 260. The side wall 230 preferably includes protrusions 235. The protrusions 235 are areas of thickened material that stabilize the side wall 230 and balance the stresses with the cover 270.

As shown in FIG. 1, the cover 270 forms a structure, similar to a dormer window on a house roof, with a top 265 and sides 275 that extend outwardly from the side wall 230 to define a forward face 280. The opening 260 is preferably a generally horizontal slot that is recessed inwardly from the forward face 280.

The body 200 is typically molded of a flexible material, like rubber or polyurethane, so it can respond to movement of the enclosed suspension parts. In many applications, such as ball joints, the body 200 may be compressed or flexed and the lubricant within is placed under pressure. This pressure places stress on the side wall 230. With the present invention, the slot 260 flexes and opens to relieve the pressure. Because the slot 260 is recessed and has the cover 270, it has protection from external debris that may enter the slot 260 if it was not protected.

Figure 2:
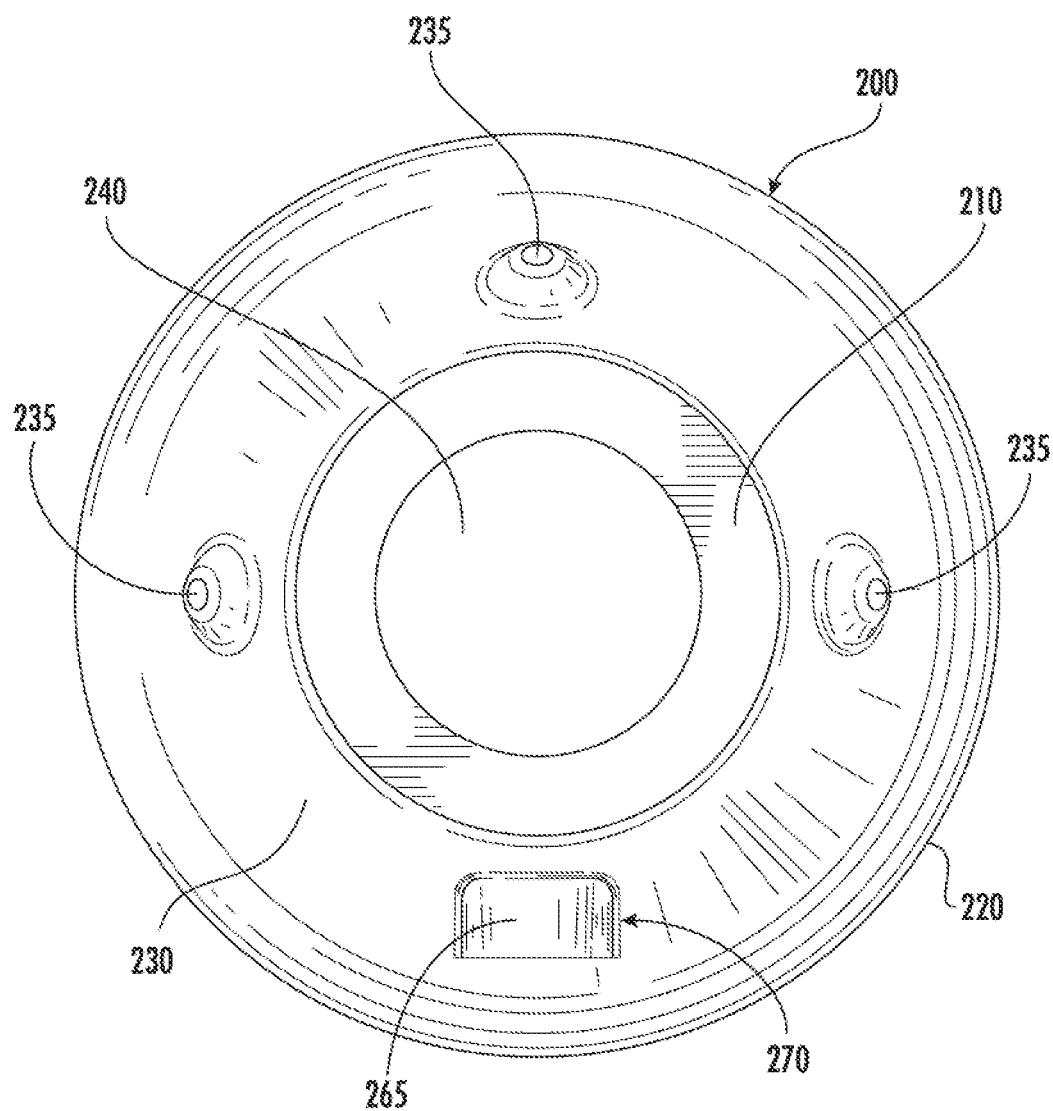
FIG. 2 is a top view of the boot in FIG. 1.

As shown in FIG. 2, the first surface 210 defines an opening 240 that extends through the second surface 220. The diameter of the opening 240 and the side wall 230 increases from the first surface 210 to the second surface 220, thereby creating the dome shaped body 200. As shown in FIG. 2, the reinforcement protrusions 235 are preferably spaced at equal distance around the circumference of the dome shaped body 200.

Figure 3:
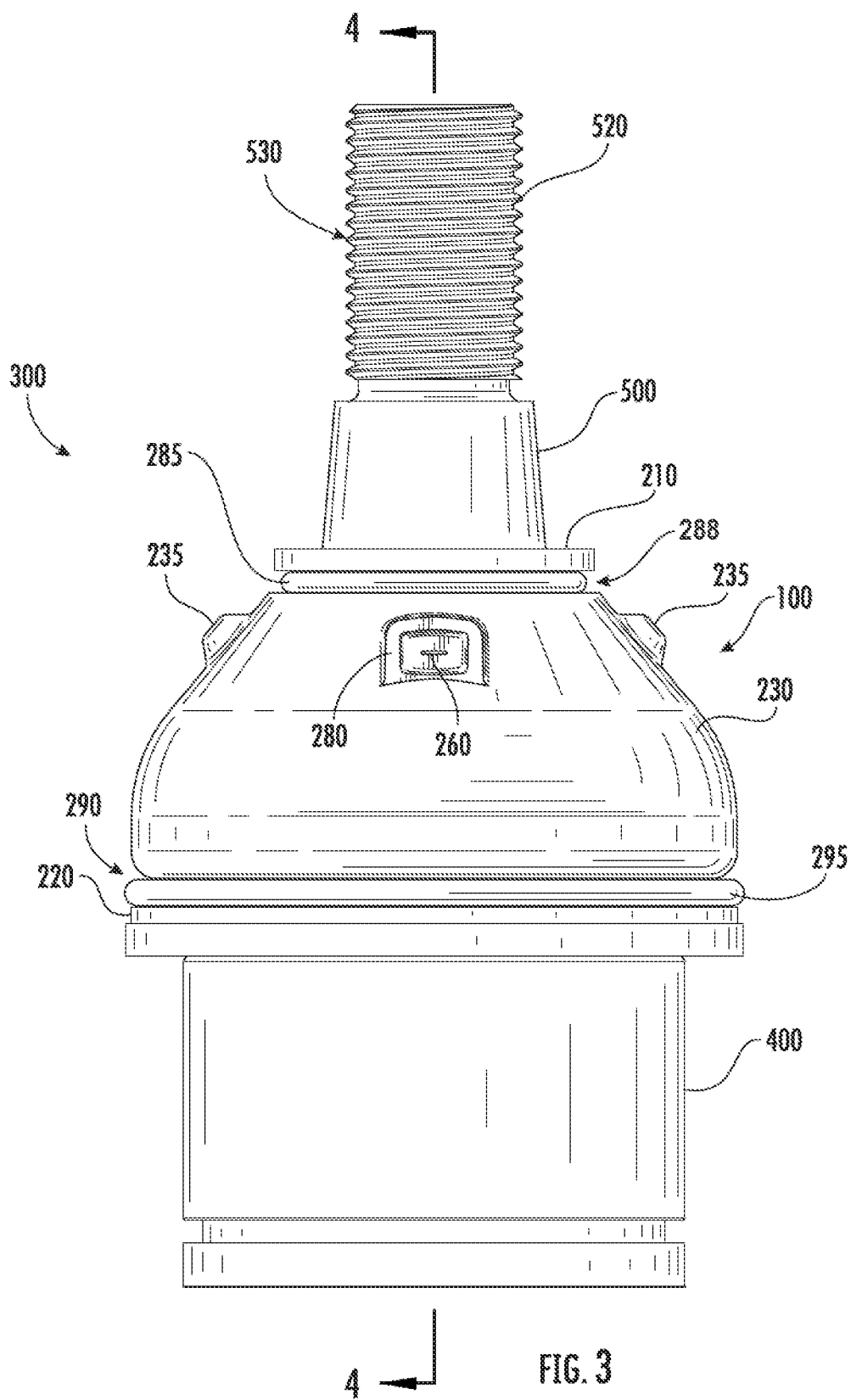
FIG. 3 illustrates a boot according to the invention on a ball joint assembly.
Figure 4:
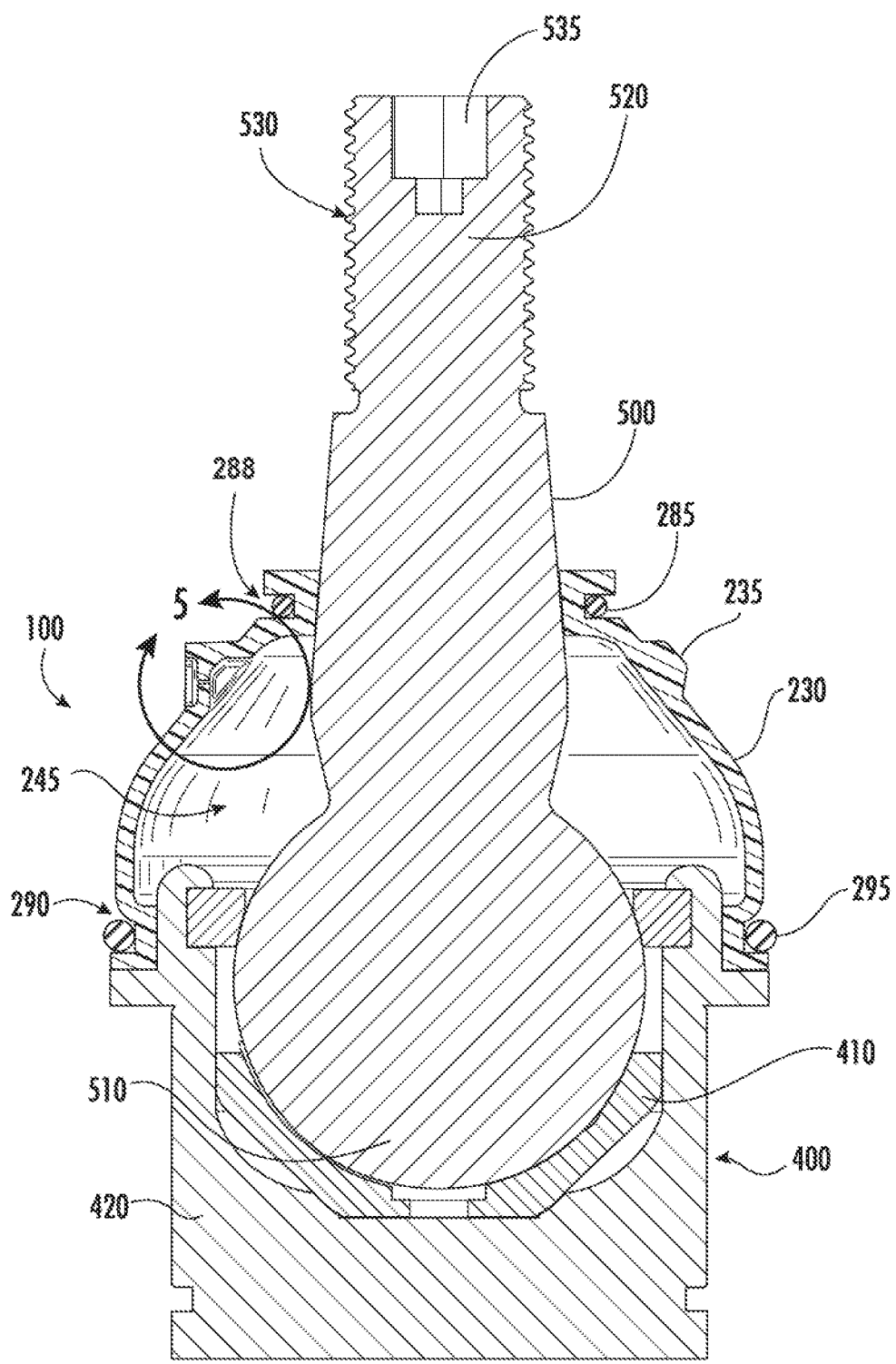
FIG. 4 is a section view along the line 4-4 of FIG. 3.

As illustrated in FIGS. 3 and 4, the boot 100 is useful in conjunction with a ball joint assembly 300. The ball joint 300 includes the boot 100, the base 400, and the bearing stud 500. The second surface 220 of the boot 100 fits on a lip at the open end of the socket assembly 400. The bearing stud 500 has a ball end 510 and an elongated shaft 520 that extends through the boot 100 and out of the first surface 210 to provide the connecting threads 530. The side wall 230 includes upper recess 288 and lower recess 290 which are configured to hold an upper compression ring 285 and a lower compression ring 295 respectively that secure the boot 100 to the assembly 300.

As shown in FIG. 4, the base 400 has a polymer bearing 410 in the bowl shaped housing 420 on which ball 510 moves. The base 400 is typically lubricated in the bowl shaped housing 420 and in the lubricant receiving area 245. Normal operation of the ball joint assembly can cause movement of the lubrication and a pressure build up in the lubricant receiving area 245. In some applications, the end of the elongated shaft 520 has a recess 535 that is configured for an Allen or hex wrench or a ratchet pin.

Figure 5:
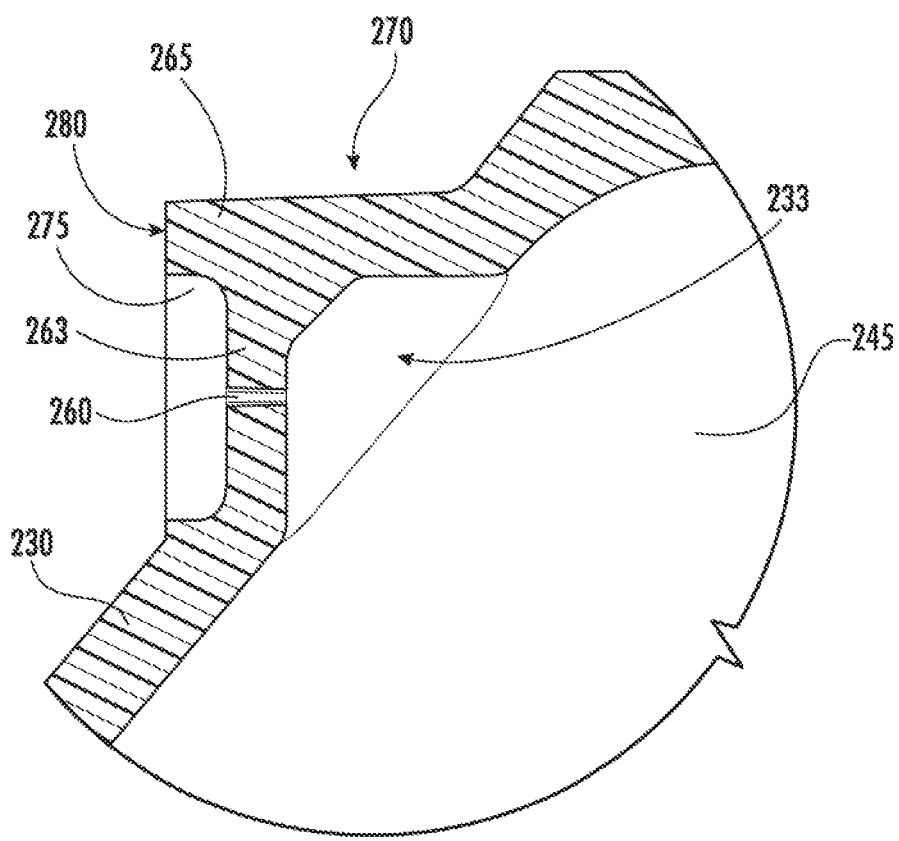
FIG. 5 is an enlarged view of area 5 in FIG. 4.

As shown in enlarged FIG. 5, the boot 100 has a relief opening 260 in the side wall 230. The boot 100 has a typical cross section throughout except in the area of the cover 270. The side wall 230 has an internal recess 233 that communicates with the relief opening 260. The side wall 230 has a reduced thickness in the area 263 surrounding relief opening 260 to further facilitate the opening and flexing of the relief opening 260.

These structural features help to direct excess pressure toward the relief opening 260 which flexes and opens. In those cases where lubricant is pushed out the relief opening 260, it possible for lubricant to stick to the side wall 230 and attract debris that could enter the relief opening 260 when it opens again.

The cover 270 serves as a protective covering for the relief opening 260 and reduces exposure of the relief opening 260 to dirt, dust, and debris in the surrounding environment. As shown in FIG. 5, the area of the relief opening 260 is recessed inwardly from the forward face 280 of the cover 270. The top 265 and sides 275 of the cover 270 create a hood over the recessed relief opening 260 that prevents external debris from entering the boot through the open relief opening 260.

What is claimed is:

1. A dust boot comprising:
a body with a first open surface, a second open surface, and a side wall that extends between the first open surface and the second open surface and defines an internal lubricant receiving area, and
the side wall includes an exterior surface, an interior surface and at least one relief opening that extends between the interior surface and the exterior surface and the exterior surface includes a cover that overlies the at least one relief opening and extends from the exterior surface so that the at least one relief opening is recessed inwardly from a forward edge of the cover.

2. The dust boot of claim 1, wherein the side wall has a reduced thickness in the area of the at least one relief opening.

3. The dust boot of claim 1, wherein the side wall has an internal recess that provides access between the internal lubricant receiving area and the at least one relief opening.

4. The dust boot of claim 3, wherein the side wall has a reduced thickness in the area of the at least one relief opening.

5. The dust boot of claim 1, wherein the side wall has at least one area of increased thickness that forms a projection from the side wall.

6. The dust boot of claim 5, wherein the at least one area of increased thickness that forms the projection from the side wall is positioned on a side opposite to the at least one relief opening.

7. The dust boot of claim 5, wherein the side wall has a reduced thickness in the area of the at least one relief opening.

8. The dust boot of claim 7, wherein the side wall has an internal recess that provides access between the internal lubricant receiving area and the at least one relief opening.

9. The dust boot of claim 1, wherein the cover that overlies the at least one relief opening includes a top and two sides that define the forward edge.

10. The dust boot of claim 1, wherein the side wall has a dome shape and the cover that overlies the at least one relief opening projects outwardly from the dome shape.

11. A suspension assembly comprising:
a socket assembly that includes a ball seat and a bearing stud that has a first end with a ball that fits within the ball seat and a second end with an elongated shaft;
a boot with a first open surface, a second open surface, and a side wall that defines a lubricant receiving area between the first open surface and the second open surface, the side wall has a first thickness defined between an exterior surface and an interior surface, a relief opening in the exterior surface and a cover on the exterior surface that extends over the relief opening and away from the exterior surface so that the relief opening is recessed inwardly from a forward edge of the cover; and,
the elongated shaft extends through one of the first open surface and second open surface of the boot, and a portion of the elongated shaft is within the lubricant receiving area;
whereby pressure generated in the lubricant receiving area is relieved through the relief opening.

12. The suspension assembly of claim 11, wherein the boot is dome shaped.

13. The suspension assembly of claim 11, wherein the cover includes a top and two sides that define the forward edge.

14. The suspension assembly of claim 11, wherein the assembly is pre-lubricated.

15. The suspension assembly of claim 11, wherein the elongated shaft includes threads.

16. The suspension assembly of claim 11, wherein the socket assembly includes a polymer bearing.

17. The suspension assembly of claim 11, further includes a first ring that secures the boot around the second end of the bearing stud and a second ring that secures the boot to the socket assembly.

* * * * *